(12) United States Patent
Takahashi et al.

(10) Patent No.: US 6,428,919 B1
(45) Date of Patent: Aug. 6, 2002

(54) FUEL CELL SYSTEM HAVING A DEFROSTING FUNCTION

(75) Inventors: Hideo Takahashi; Youichi Yagi, both of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/518,149

(22) Filed: Mar. 3, 2000

(30) Foreign Application Priority Data

Mar. 3, 1999 (JP) .......................................... P11-055476

(51) Int. Cl.[7] ................................................ H01M 8/18
(52) U.S. Cl. ............................ 429/19; 429/12; 429/20; 429/26
(58) Field of Search .............................. 429/12, 19, 20, 429/26; 180/65.3

(56) References Cited

U.S. PATENT DOCUMENTS 6,186,254 B1 * 2/2001 Mufford et al. ............ 180/65.3

FOREIGN PATENT DOCUMENTS

JP          8-273689          10/1996

* cited by examiner

*Primary Examiner*—Carol Chaney
*Assistant Examiner*—Dah-Wei Yuan
(74) *Attorney, Agent, or Firm*—Foley & Lardner

(57) ABSTRACT

A fuel cell system of the present invention includes a fuel cell, a reformer which has a combustor and supplies hydrogen containing gas to the fuel cell, and a compressor for supplying oxygen containing gas to the fuel cell. In this fuel cell system, the component devices of the fuel cell system are defrosted by heating in which the exhaustion gas from the combustor is directly utilized and by heating in which the oxygen containing gas heated by the exhaustion gas from the combustor is utilized.

11 Claims, 4 Drawing Sheets

FUEL CELL SYSTEM HAVING A DEFROSTING FUNCTION

BACKGROUND OF THE INVENTION

The present invention relates to a fuel cell system, and more specifically, a fuel cell system having a defrosting function for defrosting component devices or the like of the system.

In a fuel cell system, water is produced on the cathode side as a result of the cell reaction in the fuel cell. Water produced in such a manner (which will be referred to as "the produced water" hereinafter) is retrieved to a tank and then circulated to be used as supply water to a reformer, in order to increase electricity-generation efficiency and decrease frequency in water supply.

Japanese patent application Laid-Open publication No.8-273689 discloses defrosting of water distributing pipes in a fuel cell system.

SUMMARY OF THE INVENTION

As a result of elaborate study by the present inventors, it has been found out that, in a fuel cell system, in a case in which the fuel cell system is applied to a vehicle such as an electric car or the like, the produced water by the cell reaction is often accumulated in the system due to its frequent switching between the operation state and the stopped state.

Since the vehicle is quite often used in a region of cold climate, it is very important that countermeasure is taken so that the ice or frost derived from the produced water is reliably defrosted.

More specifically, such countermeasure should be taken in a sufficient level not only for the water distributing pipes in a fuel cell system, but also for various devices constituting the fuel cell system.

As an example of such various component devices which require defrosting treatment is a battery for the vehicle. This is because, in the battery for the vehicle, the battery capacity during operation needs to be maintained at a predetermined value or more in order that some auxiliary devices in the vehicle such as a compressor or a pump which consume a large amount of electricity can be swiftly and surely actuated if required in a low temperature environment.

The present invention has been achieved on the analysis described above and an object thereof is to provide a fuel cell system having a defrosting function for defrosting related devices in the fuel cell system.

The fuel cell system of the present invention comprises a fuel cell, a reformer having a combustor and supplying hydrogen containing gas to the fuel cell, a first defrosting system introducing exhaustion gas from the combustor to a first group of system component devices, a compressor supplying oxygen containing gas to the fuel cell, a heater heating the oxygen containing gas from the compressor by utilizing the exhaustion gas from the combustor as a heat source, a second defrosting system introducing the oxygen containing gas heated by the heater into a gas-liquid path of a second group of system component devices, and a third defrosting system introducing the oxygen containing gas heated by the heater into the outer surface of a third group of system component devices.

In other words, the fuel cell system of the present invention comprises a fuel cell, a reforming means for supplying hydrogen containing gas to the fuel cell, the reforming means having a combustor, a first defrosting means for defrosting a first group of system component devices by introducing exhaustion gas from the combustor thereto, a compressing means for supplying oxygen containing gas to the fuel cell, a heating means for heating the oxygen containing gas from the compressing means by utilizing the exhaustion gas from the combustor as a heat source, a second defrosting means for defrosting a second group of system component devices by introducing the oxygen containing gas heated by the heating means into a gas-liquid path thereof, and a third defrosting means for defrosting a third group of system component devices by introducing the oxygen containing gas heated by the heating means into the outer surface thereof.

DETAILED DESCRIPTION OF THE PREFERRED EMBODIMENTS

Hereinafter, the present invention will be described in detail according to each embodiment with reference to the accompanied drawings.

First, a fuel cell system according to a first embodiment of the present invention will be described with reference to FIG. 1 and FIG. 2.

Figure 1:
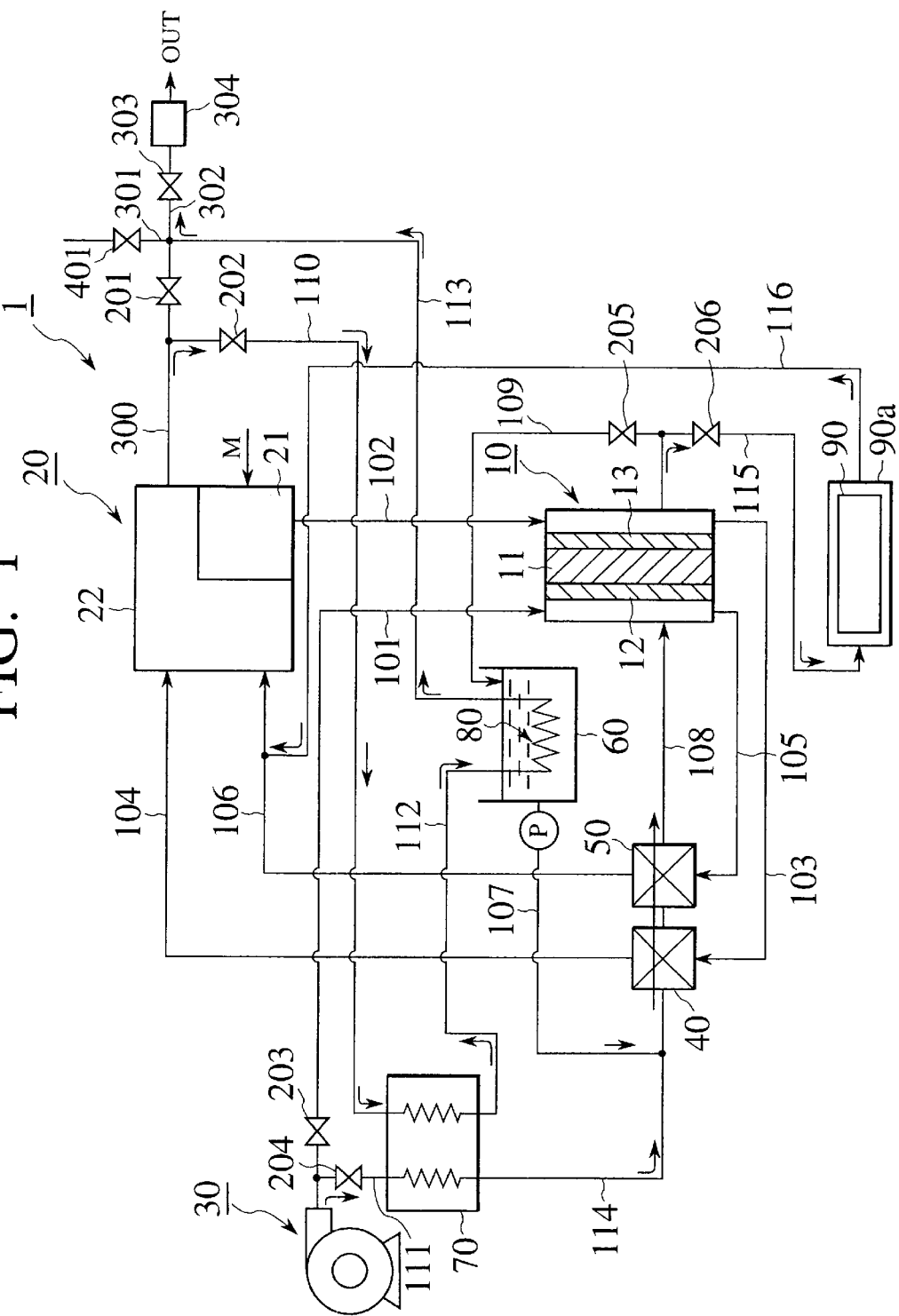
FIG. 1 is a block diagram which corresponds to the defrosting state of a fuel cell system according to a first embodiment of the present invention.
Figure 2:
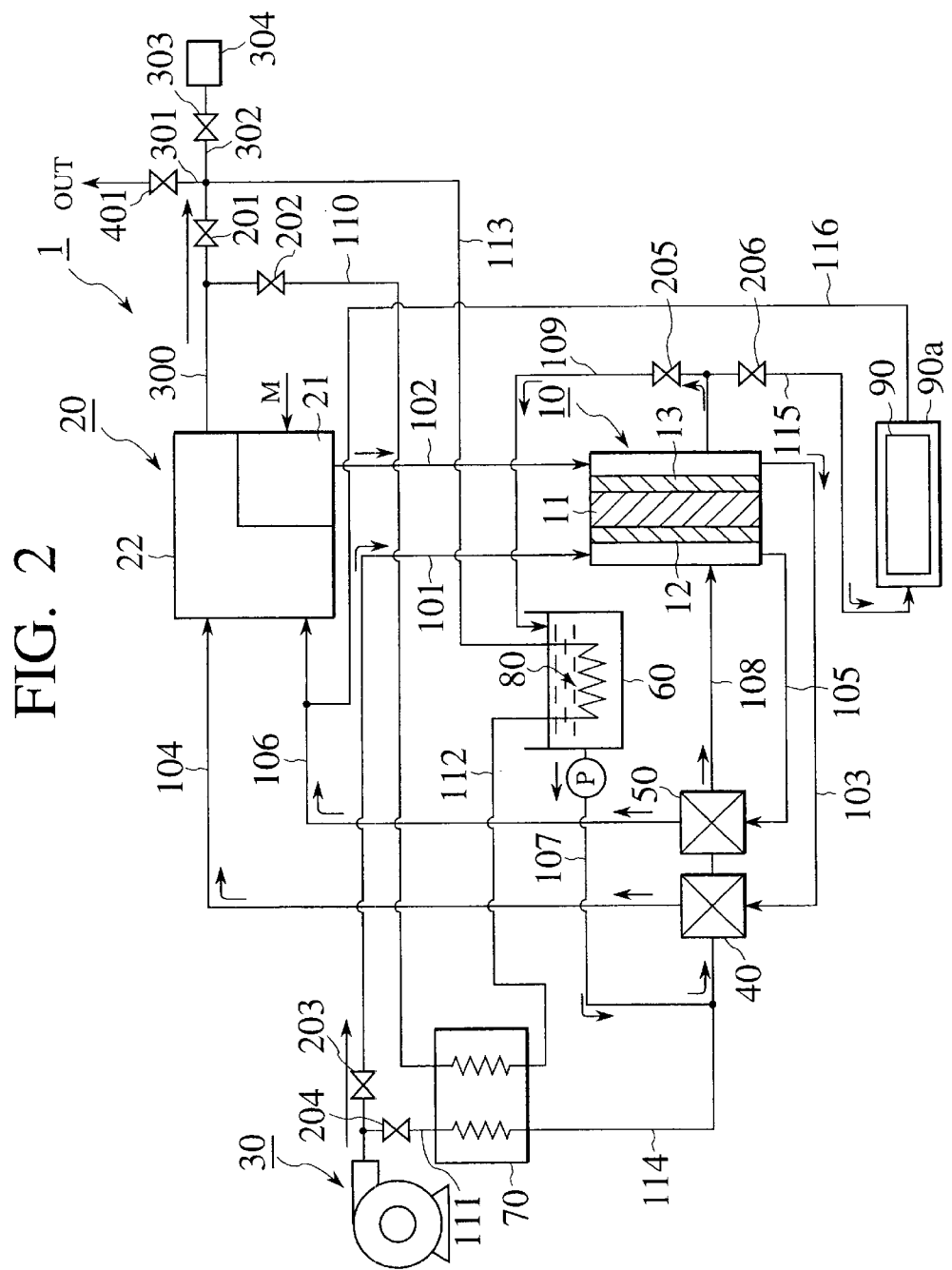
FIG. 2 is a block diagram which corresponds to the normal operation state of the fuel cell system according to the embodiment.

As shown in FIGS. 1 and 2, a fuel cell system 1 of the present embodiment has a fuel cell 10 in which a pair of electrodes 12, 13 is provided an electrolyte 11 interposed therebetween. Compressed air (oxygen containing gas) from a compressor 30 is supplied to the cathode 12 side of the fuel cell 10. Hydrogen containing gas from a reformer 20 is supplied to the anode 13 side of the fuel cell 10. These supply pipes are denoted by 101 and 102.

The compressor 30 sucks up air, compresses it to $2 \times 10^5$ Pa or so and supplies the compressed air to the fuel cell 10. The type of the compressor is not particularly limited, and a piston type compressor, a scroll type compressor, a turbo type compressor or the like can be employed.

The temperature of the air supplied to the fuel cell 10 is preferably within the range of 80–85° C. However, the temperature of the air after having been compressed by the compressor 30 is about 170° C. Therefore, an intercooler (not illustrated) is preferably provided in the pipes between the compressor 30 and the fuel cell 10. The intercooler may be of either the water cooling type or the air cooling type.

On the other hand, the reformer 20 performs steam-reformation of methanol (a raw material) M to produce a fuel gas (hydrogen containing gas) which contains hydrogen at a high ratio. Specifically, the reformer 20 includes a reformation portion in which, after methanol and water have been supplied, the decomposing reaction of methanol and the modifying reaction of CO shown below proceed simultaneously such that a reformed gas containing $H_2$ and $CO_2$ is eventually produced as a result of these reaction, and a shift portion in which unreacted CO in the reformed gas obtained in the reformation portion and water is modified to $H_2$ and $CO_2$ by the same modifying reaction such that a fuel gas containing $H_2$ at a high ratio is produced. In FIGS. 1 and 2, the reformation portion and the shift portion are shown as 21. Methanol reaction, modifying reaction and total reaction are shown below.

Methanol reaction: $CH_3OH \rightarrow CO + 2H_2 - 9.064 \times 10^4$ J/mol

Modifying reaction: $CO + H_2O \rightarrow CO_2 + H_2 + 4.116 \times 10^4$ J/mol Total reaction: $CH_3OH + H_2O \rightarrow CO_2 + 3H_2 - 4.948 \times 10^4$ J/mol The reformer 20 is provided with a combustor 22 which has a burner for heating the reaction portion of the reformation portion and the shift portion 21 described above. A portion of the combustion gas produced in the reformer 20 itself is sent to the combustor 22, and exhaustion gas from the fuel cell 10 is also sent to the combustor 22 by way of pipes 103, 104. The unreacted $H_2$ gas in the exhaustion gas (excessive hydrogen containing gas) is combusted in the combustor 22. Further, in addition to $H_2$ gas, air which was not used in the fuel cell 10 is supplied to the combustor 22 as combustion air by way of pipes 105, 106. The exhaustion gas generated as a result of the combustion in the combustor 22 may be discharged out of the system by way of pipes 300, 301 and solenoid valves 201, 401.

The hydrogen containing gas and the air which were not reacted and discharged from the fuel cell 10 are in a state in which gas and liquid are mixed. Therefore, condenser 40, 50 are provided midway of the pipes in order that only gas is collected and supplied to the combuster 22 of the reformer 20. The condenser 40 separates the excessive exhaustion gas on the anode 13 side of the fuel cell 10 from liquid and distributes the separated hydrogen containing gas in the gaseous state to the combuster 22. The condenser 50 separates the excessive exhaustion gas on the cathode 12 side of the fuel cell 10 from the produced water contained in the exhaustion gas and distributes the separated oxygen containing gas in the gaseous state to the combustor 22.

Water as cooling water for condensation is supplied from a water tank 60 to the two condensers 40, 50 by way of pipes 107, 108 having a pump P. The cooling water is also used for cooling the fuel cell 10 by way of the pipes 108, 109 and is returned to the water tank 60.

Water which has been condensed by the condenser 50 is returned to the water tank 60. Or, the water tank 60 may reservoir water which is supplied separate from such condensed water. During the normal operation of the system, water is circulated through the pipes 107, 108 and 109 by the pump P so that the condensers 40, 50 and the fuel cell 10 are cooled by the water.

In the present embodiment, heaters 70, 80 are especially provided such that the heaters 70, 80 utilizes the combustion exhaustion gas discharged from the combustor 22 of the reformer 20 as a heat source.

The combustion exhaustion gas can be introduced into the heater 70 by way of a pipe 110. In the defrosting mode, the heater thus heats the air introduced from the compressor 30 by way of a pipe 111. In order to carry out switching between the defrosting mode and the normal operation mode, solenoid valves 201, 202 are provided in the pipes 300, 110, respectively. In addition, solenoid valves 203, 204 are provided in the pipes 101, 111, respectively. In the defrosting mode, the solenoid valve 201 is closed and the solenoid valve 202 is opened such that the combustion exhaustion gas is intruded into the heater 70, and the solenoid valve 203 is closed and the solenoid valve 204 is opened such that the compressed air is introduced into the heater 70. Due to this, the compressed air is heated by the combustion exhaustion gas.

The heater 80 is provided inside of the water tank 60 or on the outer surface of the water tank 60. The water in the water tank 60 is heated by the combustion exhausting gas passing through the water tank 60 by way of a pipe 112 which continuously extends from the heater 70. The exhaustion gas which has passed through the heater 80 provided in the water tank 60 heats devices 304 as other components of the fuel cell system 1, by way of a pipe 113 and on the downstream side of a pipe 302 connected downstream of the solenoid valve 201 of the pipe 300 and then by way of a valve group 303. The combustor 22, the pipes 300, 110, 112, the heater 80, the pipes 113, 302, the valve group 303 and the devices 304 constitute a first defrosting system.

On the other hand, the compressed air heated by the heater 70 is introduced into the condenser 40, 50 by way of the pipe 114. The cooling water is fed during the normal operation to the pipes 107, 108 and 109 which are located on the upperstream and the downstream side of the condensers 40, 50. However, in the defrosting mode, the compressed air which has been heated is introduced into a portion of the pipes 107, 108 and 109 such that defrosting is effected therein. The combustor 22, the pipes 300, 110, the heater 70, the compressor 30, the pipes 111, 114, 108 constitute a second defrosting system. The pipes 114 and 108 correspond to gas-liquid paths of the condensers 40, 50.

On the downstream side of the fuel cell 10, a pipe 115 is provided for introducing the compressed air which has been heated by the heater 70 into a battery 90. The compressed air is introduced into a duct 90a which covers the outer surface of the battery 90 by way of the pipe 115 and then returned to the air inlet pipe 106 of the combustor 22 by way of a pipe 116 (this is only schematically shown in the drawing). Solenoid valves 205, 206 are provided in the pipes 109, 115, respectively, thereby allowing switching between the defrosting mode and the normal operation mode. In the defrosting mode, the solenoid valve 205 is closed and the solenoid valve 206 is opened, in order that the compressed air which has been heated is introduced into the battery 90 from the fuel cell 10 by way of the pipe 115 thereby effecting defrosting of the battery 90. On the other hand, in the normal operation mode, the solenoid valve 206 is closed and the solenoid valve 205 is opened, in order that the cooling water which has passed through the fuel cell 10 is returned to the water tank 60 by way of the pipe 109. The pipes 115, 116 and the duct 90a of the battery 90 constitute a third defrosting system.

Further, the pipe 109 on the downstream side of the fuel cell 10, the pipe 107 on the exit side of the water tank 60, and the pump P are defrosted by the combustion exhaustion gas when the combustion exhaustion gas passes through the heater 80 and reaches the pipe 109 (not illustrated).

Next, the operation of the fuel cell system having the aforementioned structure will be described hereinafter.

First, in the defrosting mode, the solenoid valve 201 is closed and the solenoid valve 202 is opened such that the exhaustion gas from the combustor 22 is sent to the heater 70. The solenoid valve 203 is closed and the solenoid valve 204 is opened such that the compressed air from the compressor 30 is sent to the heater 70. In addition, the solenoid valve 205 in the pipe 109 on the downstream side of the fuel cell 10 is closed and the solenoid valve 206 in the pipe 115 is opened.

Due to this, the exhaustion gas which has been heated to a high temperature by the combustor 22 is introduced into the heater 70 and the compressed air from the compressor 30 is introduced into the heater 70, thereby effecting heating the compressed air. In addition, the combustion exhaustion gas which has passed through the heater 70 defrosts the inside of the water tank 60 by passing through the heater 80 provided in the water tank 60. Further, by this combustion exhaustion gas which has passed through the heater 80, the pipe 109 on the downstream side of the fuel cell 10, the pipe 107 on the exit side of the water tank 60, and the pump P are defrosted. The combustion exhaustion gas which was utilized for defrosting in the aforementioned manner is introduced into the pipe 302 on the downstream side of the pipe 300 of the reformer 20, further defrosts the component devices 304, and then discharged out of the fuel cell system. It should be noted that the solenoid valve 401 is closed and the solenoid valve 303 is opened here.

On the other hand, the compressed air which has been heated by the heater 70 is introduced into the condensers 40, 50 by way of the pipes 114 and defrosts the inside of the flow paths of the cooling water by passing through these flow paths in the condensers 40, 50. The hot compressed air further defrosts frozen cooling water accumulated in the flow paths of the cooling water of the pipe 108 and the fuel cell 10 by passing through these flow paths of the pipe 108 and the fuel cell 10. The compressed air is then introduced into the duct of the battery 90 by way of the pipe 115 and effects defrosting of the battery 90 when it passes through the duct. The compressed air which was used for defrosting the battery 90 is returned to the combustor 22 by way of the pipe 116.

As described above, in the fuel cell system 1 of the present embodiment, defrosting of the condensers 40, 50 and the battery 90, as well as the water distributing pipes can be carried out when the system is actuated in a low temperature environment or the like, thereby reliably and excellently preventing any malfunctioning of the fuel cell system 1 in a low temperature environment.

During the normal operation, as shown in FIG. 2, the solenoid valves 201, 401 are opened and the solenoid valves 202, 303 are closed in order that the exhaustion gas from the combustor 22 is directly discharged out of the system. The solenoid valves 203 is opened and the solenoid valve 204 is closed in order that the compressed air is distributed from the compressor 30 to the fuel cell 10. Further, the solenoid valve 205 in the pipe 109 on the downstream side of the fuel cell 10 is opened and the solenoid valve 206 in the pipe 115 is closed.

Due to this, the compressed air from the compressor 30 is supplied to the cathode 12 side of the fuel cell and the hydrogen containing gas generated in the reformer 20 is supplied to the anode 13 side of the fuel cell 10, thereby effecting the electric-chemical reaction between oxygen and hydrogen in the fuel cell 10 and the power supply from the fuel cell 10 to the battery 90 and other electric devices.

The compressed air which has passed through the cathode 12 side of the fuel cell 10 is sent to the condenser 50, and after the produced water is separated from the compressed air, only the air is sent to the combuster 22. The hydrogen containing gas which as passed through the anode 13 side of the fuel cell 10 is sent to the condenser 40, and only the gaseous constituent thereof is sent to the combustor 22 to be subject to the combustion process. The water reservoired in the water tank 60 is distributed to the condensers 40, 50 by the pump P and this cooling water is returned to the water tank 60 after being used for cooling the fuel cell 10.

Here, order in which the system component devices in each of the aforementioned defrosting systems are defrosted will be described with reference to some examples.

As a first example, the various component devices of the fuel cell system 1 may be defrosted in accordance with the degree of required cleanness of the environment in which each device has to be maintained.

Specifically, some component devices may need to be maintained in a cleaner environment than other component devices because such component devices are more susceptible to existence of foreign materials. Therefore, it is reasonable to defrost the component devices in the defrosting system such that, the cleaner environment the component device requires, the earlier the device is defrosted by the hot compressed air or the like. In this case, as the devices which require a cleaner environment than other devices are heated prior to other devices by relatively clean compressed air or the like, those devices can reliably be maintained in a clean environment. Here, such defrosting may be more preferably effected by using the compressed air which has been heated than by using the combustion exhaustion gas itself.

As a second example, the various component devices of the fuel cell system 1 may be defrosted in accordance with the degree of heat capacity of each device.

In a case in which some component devices have a larger heat capacity than other component devices, it is reasonable to defrost the component devices in the defrosting system such that, the larger heat capacity the component device has, the earlier the device is defrosted by the combustion exhaustion gas or the heated compressed air. In this case, as the component devices having a large heat capacity are heated prior to other devices by relatively hot compressed air, more reliable and more efficient defrosting can be carried out.

As a third example, the various component devices of the fuel cell system 1 may be defrosted in accordance with the degree of heat resistance property of each device.

In a case in which some component devices have poorer heat resistance property than other component devices, it is reasonable to defrost the component devices in the defrosting system such that, the more excellent heat resistance property the component device has, the earlier the device is defrosted by the combustion exhaustion gas or the heated compressed air. In this case, as the component devices having excellent heat resistance property are heated prior to other devices by relatively hot air, excessively heating the component devices having poor heat resistance property during defrosting can reliably and effectively be prevented. In addition, in a case in which two or more component devices have heat capacities substantially equal to each other, it is preferable that each of the two or more component devices is defrosted such that the more excellent heat resistance property the component device has, the earlier the device is defrosted.

In the present embodiment, the component devices in each defrosting system are defrosted in accordance with the order which has been determined by comprehensive consideration of the degree of required cleanness of the environment in which each device has to be maintained, the heat capacity and the heat resistance properties of each device.

In addition, the definition of each defrosting system such that each component device is defrosted in its suitable heating manner is determined in consideration of the aforementioned characteristics of each component device.

As described above, according to the structure of the present embodiment, a defrosting system in which the exhaustion gas of the combustor of the reformer is directly utilized as a heat source, specifically the first defrosting system, and defrosting systems in which the air heated up by the exhaustion gas, that is the oxygen containing gas, is indirectly utilized as a heat source, specifically, the second defrosting system and the third defrosting system, are preferably arranged. These defrosting systems each effect defrosting to the component devices within each system. Accordingly, the outer surface of the component devices of each system, the inside of such component devices, and the gas-liquid flow paths of such component devices can be defrosted, such that an excellent operation state of the fuel cell system can always be realized in a low temperature environment.

Further, the paths for returning, the oxygen containing gas which has been introduced into the outer surface/the inside of the component devices or the gas-liquid flow paths of the component devices for the purpose of defrosting, into the inlet of the combustor are provided. Accordingly, the heating medium which was utilized as the heat source for defrosting can be re-utilized, achieving a more energy efficient system.

In the present embodiment, the component devices of each system include the water tank which directly utilizes the exhaustion gas from the combustor as a heat source, the condensers for the exhaustion gas of the fuel cell which utilizes as a heat source the oxygen containing gas heated by the exhaustion gas from the combustor, the battery and other devices. However, the present invention is not limited by these examples and may employ any devices according to necessity.

Next, a fuel cell system according to a second embodiment of the present invention will be described with reference to FIG. 3 and FIG. 4.

Figure 3:
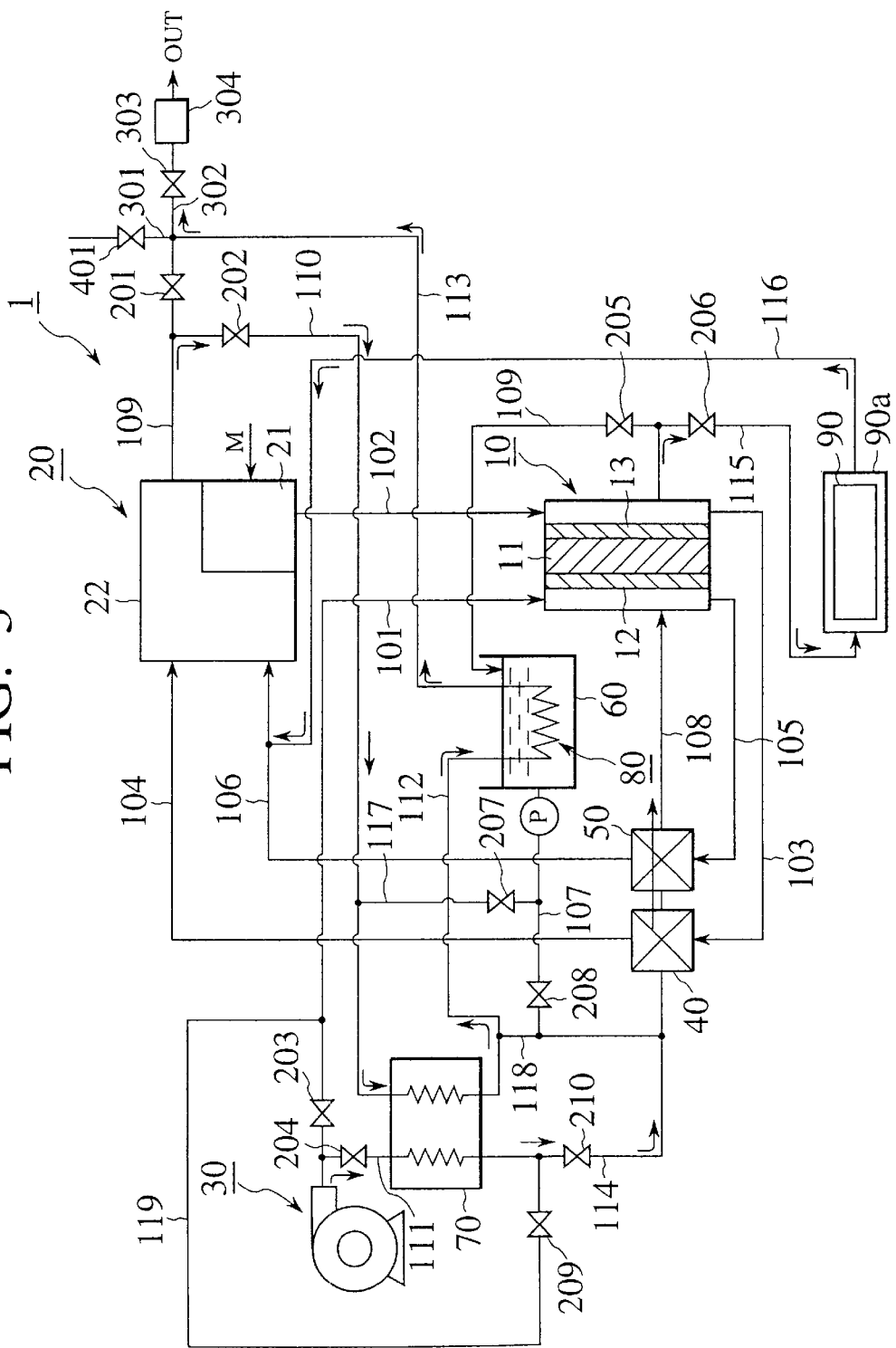
FIG. 3 is a block diagram which corresponds to the defrosting state of a fuel cell system according to a second embodiment of the present invention.
Figure 4:
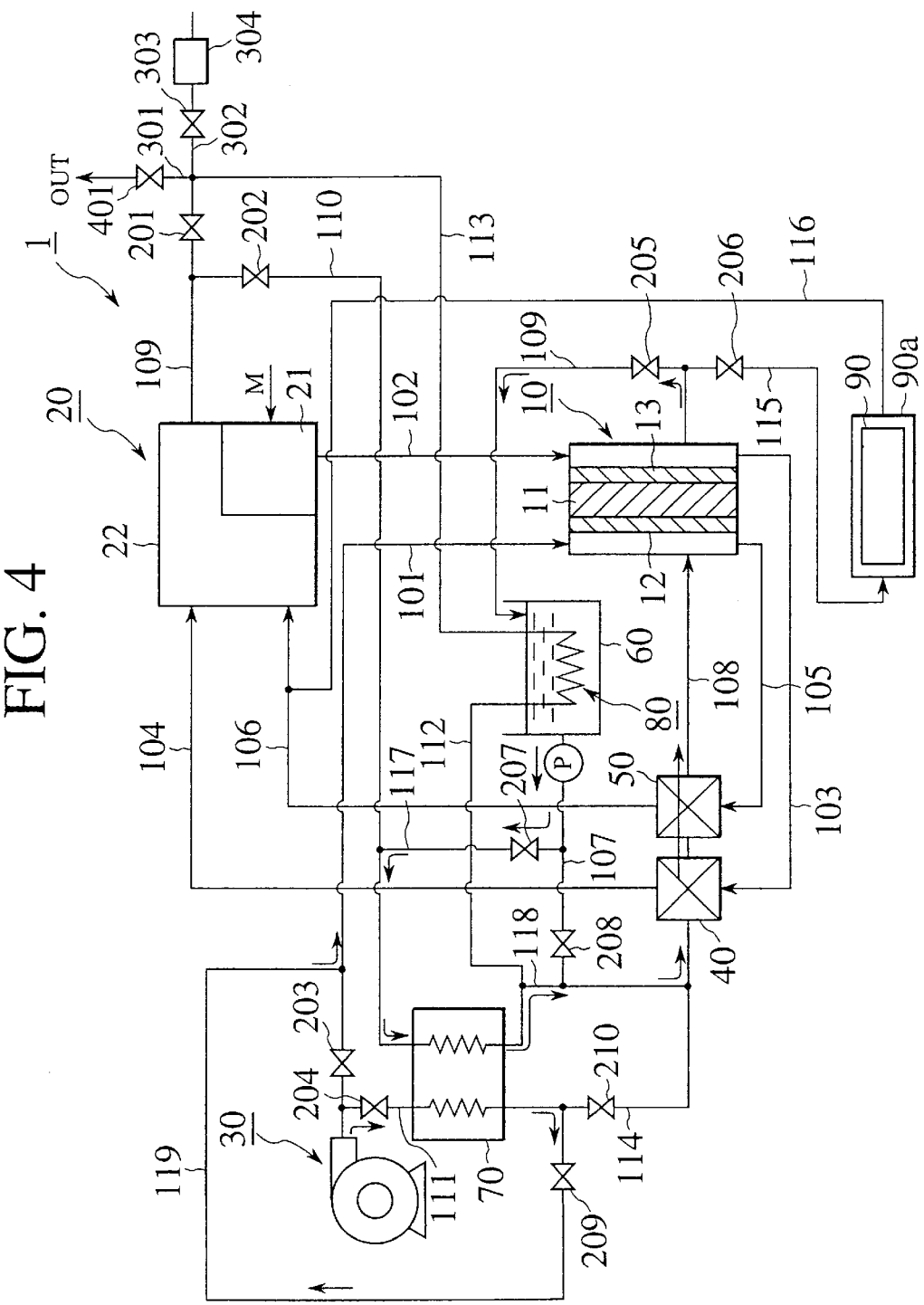
FIG. 4 is a block diagram which corresponds to the normal operation state of the fuel cell system according to the embodiment.

As shown in FIGS. 3 and 4, the fuel cell system 1 of the present embodiment has basically the same structure and function as the fuel cell system of the first embodiment, except for the function of the heater 70 in the normal operation mode. Specifically, the fuel cell system of the present embodiment effects the same function as the first embodiment in the defrosting mode, but uses the heater 70 as a cooler in the normal operation mode. In the present embodiment, the same reference number will be given to the same components and detailed description thereof will be omitted.

As shown in FIG. 3 and FIG. 4, a pipe 117 and a solenoid valve 207 are provided for connecting the pipe 107 on the exit side of the water tank 60 with the inlet pipe 110 of the heater 70. In addition, a pipe 118 and a solenoid valve 208 are provided for connecting the pipe 107 on the exit side of the water tank 60 with the outlet pipe 118 of the heater 70. Further, a pipe 119 for connecting the pipe 114 of the heater 70 with the outlet pipe 101 of the compressor 30, as well as solenoid valves 209, 210 for switching these paths are provided.

In the defrosting mode, the solenoid valves 207, 203, 209 are closed (the solenoid valve 208 may be either closed or opened) and the solenoid valve 210 is opened, such that the combustion exhaustion gas from the combustor 22 is introduced into the heater 70 by way of the pipe 110, thereby heating the compressed air from the compressor 30 and defrost the water tank 60 by the heater 80. Further, the condensers 40, 50 and the fuel cell 10 are defrosted by the compressed air which has been heated by the heater 70.

On the other hand, during the normal operation, the solenoid valves 207 is opened, the solenoid valve 208 is closed and the pump P is operated, such that the cooling water in the water tank 60 is introduced in to the heater 70 by way of the pipes 107, 117, 110. In addition, the solenoid valves 203, 210 are closed and the solenoid valves 204, 209 are opened, such that the compressed air from the compressor 30 is cooled. Accordingly, the partial pressure of steam of the compressed air supplied to the cathode 12 side of the fuel cell 10 is suppressed and thus the decrease in fuel cell 10 is suppressed and thus the decrease in fuel gas concentration and oxygen concentration in the fuel cell 10 is prevented, thereby improving electricity generating efficiency. However, it should be noted that, if the temperature of the compressed air which is introduced into the heater 70 is too high, the temperature of the cooling water as the heat exchange medium also becomes high, resulting in introducing the cooling water of relatively high temperature into the condensers 40, 50. Therefore, in a case in which the temperature of the compressed air which is introduced into the heater 70 is at a predetermined temperature or higher, it is preferable to stop introduction of the cooling water into the heater 70.

In the present embodiment, the fact that the heater is not essentially needed during the normal operation after defrosting is considered. The paths for introducing the cooling water from the water tank into the paths for the exhaustion gas from the combustor are provided, in order that the heater is used as a cooler which cools the air which is supplied to the fuel cell, i.e., the oxygen containing gas, to an appropriate temperature by utilizing the heat exchange function of the heater. Accordingly, the decrease in the concentration of the oxygen containing gas can be effectively suppressed and thus the electricity generating efficiency can be significantly improved. In addition, the intercooler for cooling the oxygen containing gas can be made smaller or even eliminated in some cases, thereby significantly contributing to making the whole structure more compact.

In a case in which the temperature of the oxygen containing gas which is introduced into the heater becomes high, the cooling water is prevented from being introduced from the water tank into the heater. Therefore, the water as the cooling medium for the system is effectively prevented from becoming hot and thus an excellent cooling efficiency can be reliably maintained.

The entire contents of a Patent Application No. TOKUGANHEI 11-55476, with a filing date of Mar. 3, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
    a fuel cell;
    a reformer having a combustor and supplying hydrogen containing gas to the fuel cell;
    a first defrosting system introducing exhaustion gas from the combustor to a first group of system component devices;
    a compressor supplying oxygen containing gas to the fuel cell;
    a heater heating the oxygen containing gas from the compressor by utilizing the exhaustion gas from the combustor as a heat source;
    a second defrosting system introducing the oxygen containing gas heated by the heater into a gas-liquid path of a second group of system component devices; and
    a third defrosting system introducing the oxygen containing gas heated by the heater into the outer surface of a third group of system component devices.

2. A fuel cell system according to claim 1, wherein the oxygen containing gas introduced into the gas-liquid path of the second group of system component devices is returned to the combustor.

3. A fuel cell system according to claim 1, wherein the oxygen containing gas introduced into the outer surface of the third group of system component devices is returned to the combustor.

4. A fuel cell system according to claim 1, wherein the first group of system component devices includes a water tank.

5. A fuel cell system of claim 1, wherein the second group of system component devices includes a condenser of the exhaustion gas from the fuel cell.

6. A fuel cell system according to claim 1, wherein each of the first defrosting system, the second defrosting system and the third defrosting system correspondingly carries out defrosting of the first group of system component devices, the second group of system component devices and the third group of system component devices such that, among system component devices to be heated, a system component device having a larger heat capacity than other system component devices is heated prior to the other system component devices.

7. A fuel cell system according to claim 6, wherein in a case in which two or more component devices of the first group of system component devices, those of the second group of system component devices or those of the third group of system component devices have heat capacities substantially equal to each other, each of the two or more component devices is defrosted such that, among system component devices to be heated, a system component device having a higher heat resistance property than other system component devices is heated prior to the other system component devices.

8. A fuel cell system according to claim 1, wherein each of the first defrosting system, the second defrosting system and the third defrosting system correspondingly carries out defrosting of the first group of system component devices, the second group of system component devices and the third group of system component devices such that, among system component devices to be heated, a system component device having a higher heat resistance property than other system component devices is heated prior to the other system component devices.

9. A fuel cell system according to claim 1, wherein cooling water is introduced into the heater by way of a flow path of the exhaustion gas from the combustor, such that, during normal operation, the heater functions as a cooler cooling the oxygen containing gas supplied from the condenser to the fuel cell.

10. A fuel cell system comprising:
a fuel cell;
a reforming means for supplying hydrogen containing gas to the fuel cell, the reforming means having a combustor;
a first defrosting means for defrosting a first group of system component devices by introducing exhaustion gas from the combustor thereto;
a compressing means for supplying oxygen containing gas to the fuel cell;
a heating means for heating the oxygen containing gas from the compressing means by utilizing the exhaustion gas from the combustor as a heat source;
a second defrosting means for defrosting a second group of system component devices by introducing the oxygen containing gas heated by the heating means into a gas-liquid path thereof; and
a third defrosting means for defrosting a third group of system component devices by introducing the oxygen containing gas heated by the heating means into the outer surface thereof.

11. A vehicle comprising a fuel cell according to claim 1.

* * * * *